United States Patent [19]
Eitner et al.

[11] Patent Number: 6,070,012
[45] Date of Patent: May 30, 2000

[54] METHOD AND APPARATUS FOR UPGRADING SOFTWARE SUBSYSTEMS WITHOUT INTERRUPTING SERVICE

[75] Inventors: William H. Eitner, Milpitas; Suresh D. Mahanty, Mountain View, both of Calif.

[73] Assignee: Nortel Networks Corporation, Canada

[21] Appl. No.: 09/083,020

[22] Filed: May 22, 1998

[51] Int. Cl.[7] .............................. G06F 9/445; G06F 9/00; G06F 15/177

[52] U.S. Cl. .......................... 395/712; 709/221; 709/305

[58] Field of Search ............................................. 395/712

[56] References Cited

U.S. PATENT DOCUMENTS

| | | | |
|---|---|---|---|
| 4,954,941 | 9/1990 | Redman | 395/712 |
| 5,155,847 | 10/1992 | Kirouac et al. | 709/221 |
| 5,274,808 | 12/1993 | Miyao et al. | 395/712 |
| 5,339,430 | 8/1994 | Lundin et al. | 709/305 |
| 5,410,703 | 4/1995 | Nilsson et al. | 395/712 |
| 5,555,418 | 9/1996 | Nilsson et al. | 709/305 |
| 5,682,533 | 10/1997 | Siljestroemer | 707/200 |
| 5,732,275 | 3/1998 | Kullick et al. | 395/712 |

*Primary Examiner*—Eric W. Stamber
*Assistant Examiner*—Kelvin E. Booker
*Attorney, Agent, or Firm*—Finnegan, Henderson, Farabow, Garrett & Dunner, L.L.P.

[57] ABSTRACT

A method and system for updating a software subsystem while services are being provided by the software subsystem is provided. Initially, instructions are processed from a primary software subsystem loaded at a first base address associated with a primary storage unit. A secondary software subsystem is downloaded at a second base address associated with a secondary storage unit while the primary software subsystem is being executed. The secondary software subsystem typically contains an updated version of the primary software subsystem. To install the updated software subsystem, the first base address associated with the primary storage unit is swapped with the second base address associated with the secondary storage unit. Execution continues using the updated software subsystem without a significant interruption in service.

23 Claims, 8 Drawing Sheets

METHOD AND APPARATUS FOR UPGRADING SOFTWARE SUBSYSTEMS WITHOUT INTERRUPTING SERVICE

BACKGROUND OF THE INVENTION

1. Field of the Invention

This invention generally relates to network systems and more particularly, to a method and apparatus for upgrading software subsystem stored on a network system.

2. Description of the Related Art

A private branch exchange (PBX) is a telephone switch used to provide telephone service for calls made within a private group or company. Typically, the PBX uses privately leased lines or internal wire or wireless infrastructure to carry calls between a central switching device and the various users. The PBX saves usage charges on calls made entirely within the company by avoiding public telephone networks. Having a PBX also offers a multitude of features and services which can add significant business value to an organization.

Features offered on PBX systems have grown significantly as these telephone switches have become more integrated with computers. To handle incoming calls, automatic call distribution (ACD) map an incoming call to the correct party or parties of an organization. The ACD uses complex algorithms based on utilization, user activity, business rules, and other factors to route the incoming call correctly. Services based on caller line identification (CLID) enable a telephone switch to identify the telephone number of an incoming call, look up corresponding information in a database, and route the call accordingly. For example, the area code of an incoming call can be used to direct an incoming purchase request to the correct sales representative for that region or area. PBX systems are also developing voice processing and voice recognition systems to replace a human agent accessing information through a computer terminal for a particular customer.

Many companies have developed large call centers which utilize these PBX systems to deliver customer service and information. In competitive markets, many companies are able to differentiate their products and the services they provide utilizing sophisticated PBX systems. Often, they must operate 24 hours a day and seven days a week.

A conventional PBX system, such as the Merdian Evolution by Nortel, Inc., includes a central call processor (CP) shelf, a node controller (NC) unit, an access controller (AC) unit and numerous peripheral equipment (PE) devices coupled to handsets, fax modules, or voice processing modules. The CP shelf provides centralized switching capabilities between trunks of users attached to the system through multiple NC devices. The NC units act as large switching devices in directing calls and communicating with the AC units. The CP controls software upgrades by downloading loadware into specific target packs such as the NC unit, the AC units and sometimes even the PE devices. However, it is becoming increasing difficult to upgrade these various controller units without interrupting service or risking extensive downtime.

On conventional systems, upgrades involve downloading the loadware into specific target packs and reprogramming the target pack with new functionality provided in the new loadware. The NC and PE devices are two types of devices referred to as target packs and downloading a loadware module is considered upgrading a pack. Conventional systems upgrade packs using a "cold download" technique which leaves the pack in a disabled state during the upgrade process. The cold download can leave an NC inoperable and also cause calls to be dropped which may be in progress. A new load module can also make the system remain down if the downloaded portion of software is incompatible with the data structures, the communications protocols, or any other portions of the switch. If packs on a PBX were upgraded using a "hot download", the PBX system could be upgraded without significantly interrupting service for existing or new calls.

An upgrade installed incorrectly can be very difficult to uninstall on a conventional PBX. Many aspects of the installation on a conventional PBX cannot be backed out without significant human intervention. If software is incorrectly burnt in flash, the flash-based hardware device may be inoperable and need replacing. Alternatively, software may need to be upgraded manually and not automatically by the system. Either alternative leaves the PBX system down for an extended period of time which can interrupt service and prevent calls from being made.

In light of discussion above, it is desirable to develop an improved system for delivering software upgrades to a private branch exchange (PBX) in switching telephone system.

SUMMARY OF THE INVENTION

Consistent with the present invention, as embodied and broadly described herein, a method and system for updating and loading a software subsystem used by a network system device is provided. The method can be adapted to work with multiple software subsystems stored in corresponding banks of a multiple bank storage unit. The system and method can also work with a storage unit having only two different storage banks.

During the initial update process, instructions are processed from a primary software subsystem loaded at a first base address associated with a primary storage unit coupled to the network system. A secondary software subsystem is downloaded at a second base address associated with a secondary storage unit coupled to the network system while the primary software subsystem is being executed. The secondary software subsystem typically is an updated version of the primary software subsystem. To activate the updated software subsystem, the first base address associated with the primary storage unit is swapped with the second base address associated with the secondary storage unit. Execution continues using the updated software subsystem.

In another aspect of the present invention, a method and system is provided for loading a software subsystem on a network system which has a primary and secondary software subsystem. Initially, the system is booted having a primary software subsystem loaded at the first base address associated with a primary storage unit coupled to the network system. The system also has a secondary software subsystem loaded at a second base address associated with a secondary storage unit coupled to the network system. Typically, the primary and secondary storage units are different banks of a flash bank memory device. A method is used to select a software subsystem from the primary software subsystem and the secondary software subsystem which is not corrupt and contains the latest version of the software. If the secondary software subsystem is selected then the first base address associated with the primary storage unit is swapped with the second base address associated with the secondary storage unit. Otherwise, the primary software subsystem is selected and executed.

BRIEF DESCRIPTION OF THE DRAWINGS

The accompanying drawings, which are incorporated in and constitute a part of this specification, illustrate an embodiment of the invention and, together with the description, serve to explain the advantages, and principles of the invention.

In the drawings.

DETAILED DESCRIPTION OF THE INVENTION

Introduction

Reference will now be made in detail to an implementation of the present invention as illustrated in the accompanying drawings. Wherever possible, the same reference numbers will be used throughout the drawings and the following description to refer to the same or like parts.

Figure 1:
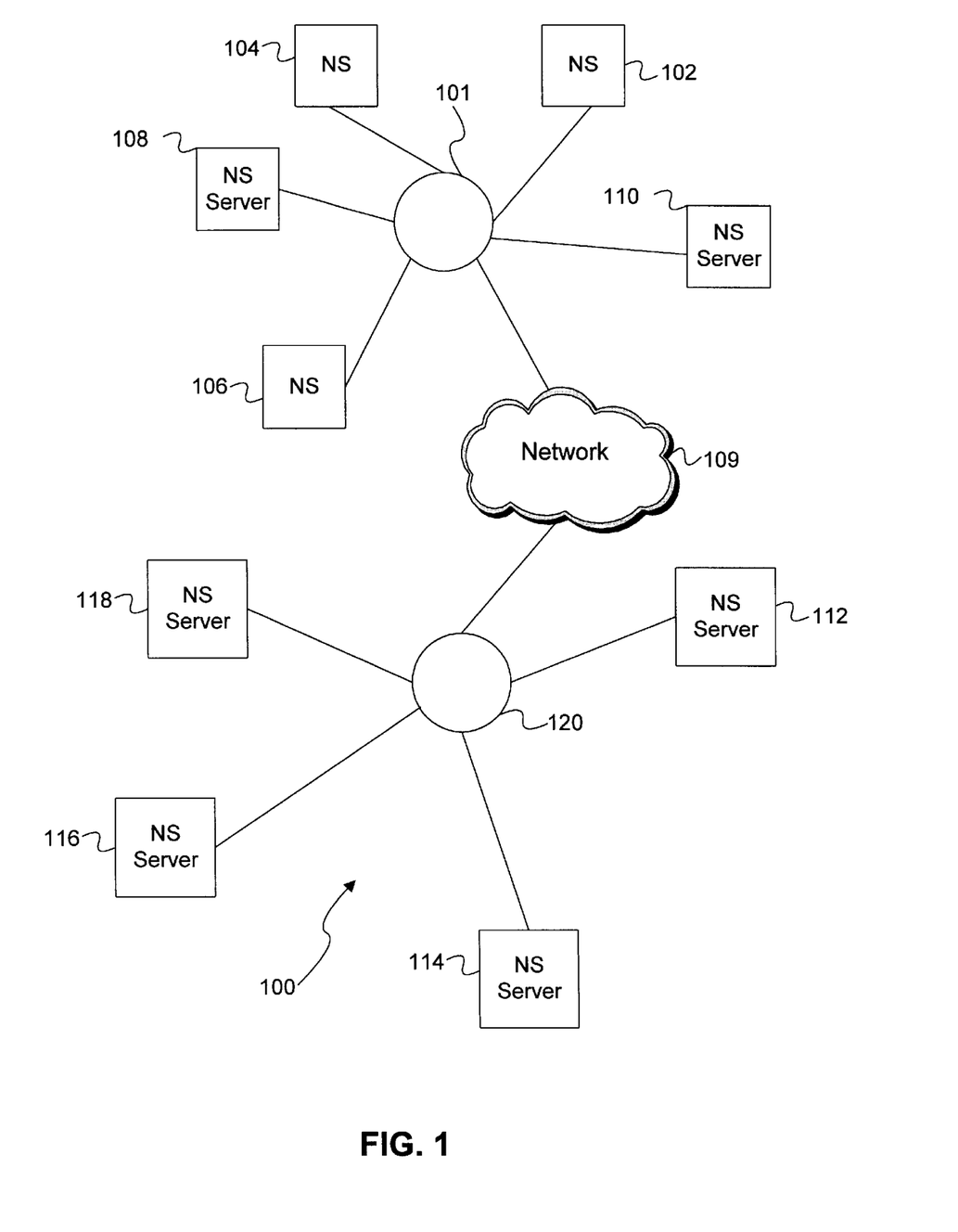
FIG. 1 illustrates a network suitable for use with methods and systems consistent with the present invention.

Systems consistent with the present invention address shortcomings of the prior art and provide a unique system and apparatus for updating a software subsystem on a network system (NS) device. NS devices can be found in almost any processor based system where processing is distributed between a master and slave or a client and server pairing. For example, FIG. 1 illustrates an exemplary network using NS devices, the clients, and NS servers suitable for use with methods and systems consistent with the present invention. Computer network 100 in FIG. 1 includes a local area network 101, a wide area network (WAN) 109, and another local area network (LAN) 120. Local area network 101 includes NS devices 102, 104 and 106 and NS servers 108 and 110. Local area network 120 includes NS servers 112, 114, 116, and 118. This exemplary configuration of NS devices and NS servers covers a class of client-server systems suitable for use with one or more embodiments of the present invention. Accordingly, these embodiments of the present invention are not limited just with telephone switching systems discussed below. Instead, the methods and systems described herein can be applied to a broad range of client-server systems such as illustrated in FIG. 1.

As applied to a telephone switching system, a control processor (CP) unit acts as a master unit, or NS server, while a node controller (NC) unit and access controller (AC) unit act as slave units, or NS devices, which take instructions from the CP unit. Each slave unit includes a unique multiple-bank storage unit implemented with field programmable read only memory (FPROM) that is commonly referred to as flash memory.

In method and systems consistent with the present invention, at least two different software subsystems are loaded into a multiple bank flash memory. At a minimum, the software subsystems include a primary software subsystem and a secondary software subsystem. Additional software subsystems and banks of storage can be used by increasing the number of software subsystems and corresponding number of banks in a flash memory device.

Each software subsystem is capable of performing similar services for the NC unit or CP unit ranging from high-level applications to lower level operating system functions. On a storage device having only two storage banks, a primary software subsystem loaded into a primary storage unit is active executing instructions while the secondary software subsystem loaded into a secondary storage unit of the dual-bank flash memory is idle. Typically, the secondary software subsystem contains an older version of the primary software subsystem before it is updated. The logical separation between the primary and secondary storage units in the flash memory enables an updated software systems to be downloaded into the flash memory device from the master unit while the slave unit continues processing instructions.

An eloquent technique is used to swap the active software subsystem in the primary bank with the updated and idle software subsystem in the secondary bank. This technique carefully selects a software subsystem which is updated and not corrupted. Accordingly, if the updated software subsystem is corrupt then the technique selects the "backdoor" option and the original active software subsystem is executed instead. The backdoor is used to revert back to the system configuration before changes or modifications were made.

Processing overhead associated with relocating the updated software subsystem in the flash memory address space is bypassed by swapping base register values of each bank in flash memory. This eliminates the bookkeeping associated with conventional systems that must map addressing on an updated module relocated to another area in flash memory. Instead, systems and methods consistent with the present invention installs updated software subsystems accurately.

Relocating the updated software subsystem facilitates a "hot download" of the software subsystem rather than the "cold downloads" found in conventional systems. That is, software updates can be applied to systems while they are operating (a "hot download") instead of requiring the system to be disabled (a "cold download") for the updates. On a telephone switch, this enables existing calls to continue without being dropped. Moreover, only a brief moment may exist where new calls can not be made on the telephone switch. This is extremely advantageous in high availability telephone switching systems and computer devices which must exhibit a minimum amount of downtime even when the various software subsystems are updated.

Telecommunication Switching Network

Figure 2:
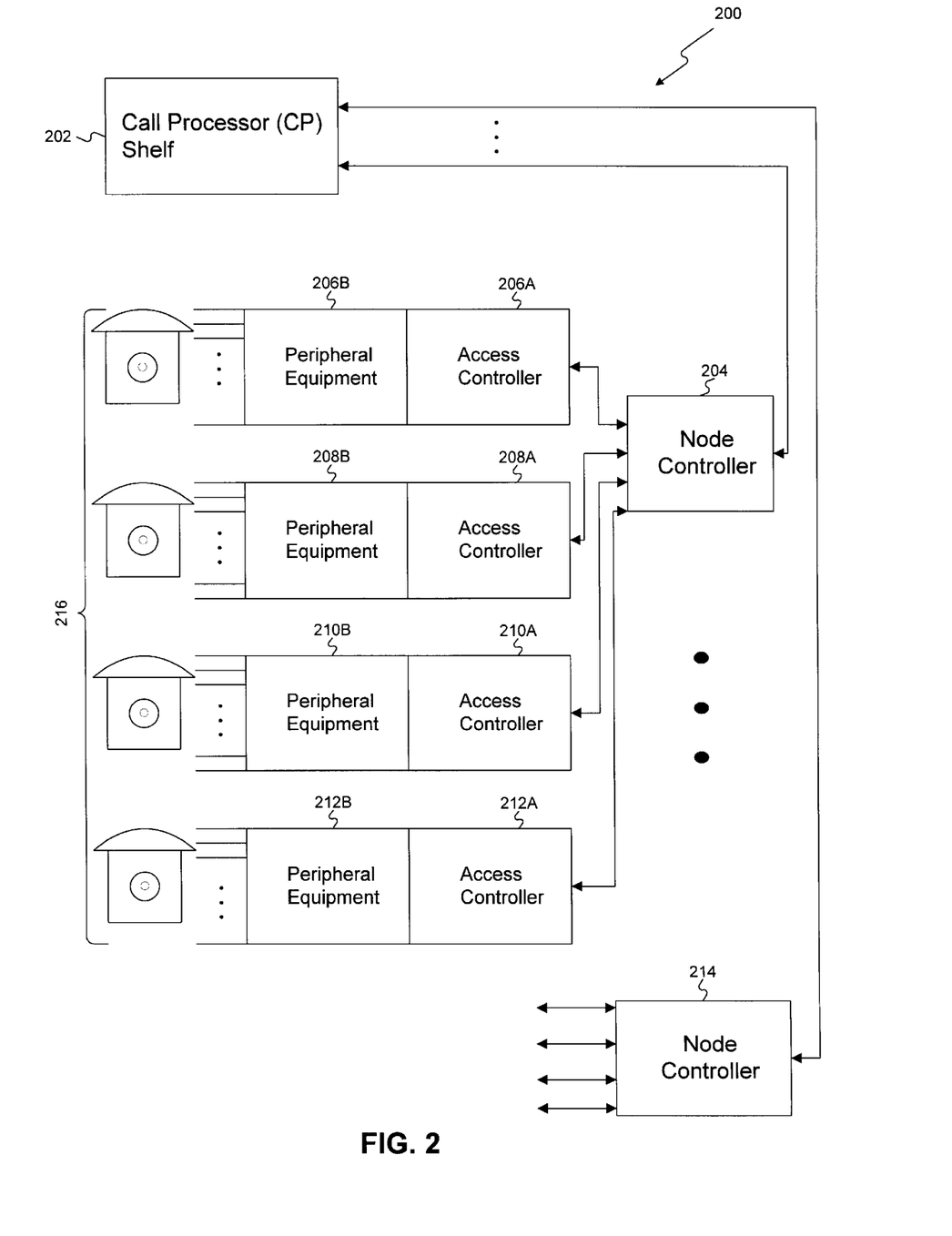
FIG. 2 illustrates a hierarchical telecommunication switch suitable for use with methods and systems consistent with the present invention.

FIG. 2 illustrates a hierarchical telecommunication switch suitable for use with methods and systems consistent with the present invention. Accordingly, hierarchical telecommunication switch 200 also known as switch 200 includes a call processor (CP) shelf 202, a node controller (NC) 204 and NC 214, and a series of peripheral equipment (PE) shelves 206B, 208B, 210B, and 212B, coupled to corresponding access controller (AC) units 206A, 208A, 210A, and 212A.

These AC units 206A, 208A, 210A, and 212A are coupled to a large number of handset devices 216 used for transmitting and manipulating voice and data information.

At the top of the switch hierarchy, system management is delegated to numerous hardware cards and software subsystems (not shown) located in CP shelf 202. Hardware and software in CP shelf 202 act as the master processing device in switch 200. In a typical scenario, hardware and software subsystems downstream from CP shelf 202 such as NC 204 and AC unit 206A communicate status on existing calls and pending calls to hardware in CP shelf 202 using objects and other constructs available in an object oriented language. Decisions are made by hardware and software in CP shelf 202 and transmitted back to the requesting downstream subsystem to carry out.

NC 204 acts essentially as a concentrator and switching device for calls transmitted between CP shelf 202 and handset units 216. The protocol used between NC 204 and CP shelf 202 is preferably TCP/IP or any other widely used networking protocol carried over a high speed communication link such as asynchronous transfer mode (ATM) or Ethernet. NC 204 is coupled to CP shelf 202 and multiple ACs 206A, 208A, 210A, and 212A. More importantly, NC 204 includes a multiple-bank flash memory (not shown) suitable for receiving software subsystem upgrades consistent with methods and systems of the present invention. The techniques used to apply software subsystem upgrades in NC 204 can also be applied to updating software subsystems in AC units 206A, 208A, 210A, and 212A.

AC units 206A, 208A, 210A, and 212A provide access to the various PE shelves 206B, 208B, 210B, and 212B. Messages and data are transmitted to different cards on each PE shelf depending on the cards specific functions. The cards on PE shelves 206B, 208B, 210B, and 212B include functions such as call forwarding, conference call, and dialtone service. Like NC units 204 and 214, AC units 206A, 208A, 210A, and 212A also includes a dual-bank flash memory (not shown) suitable for receiving software subsystem upgrades consistent with methods and systems of the present invention.

Figure 3:
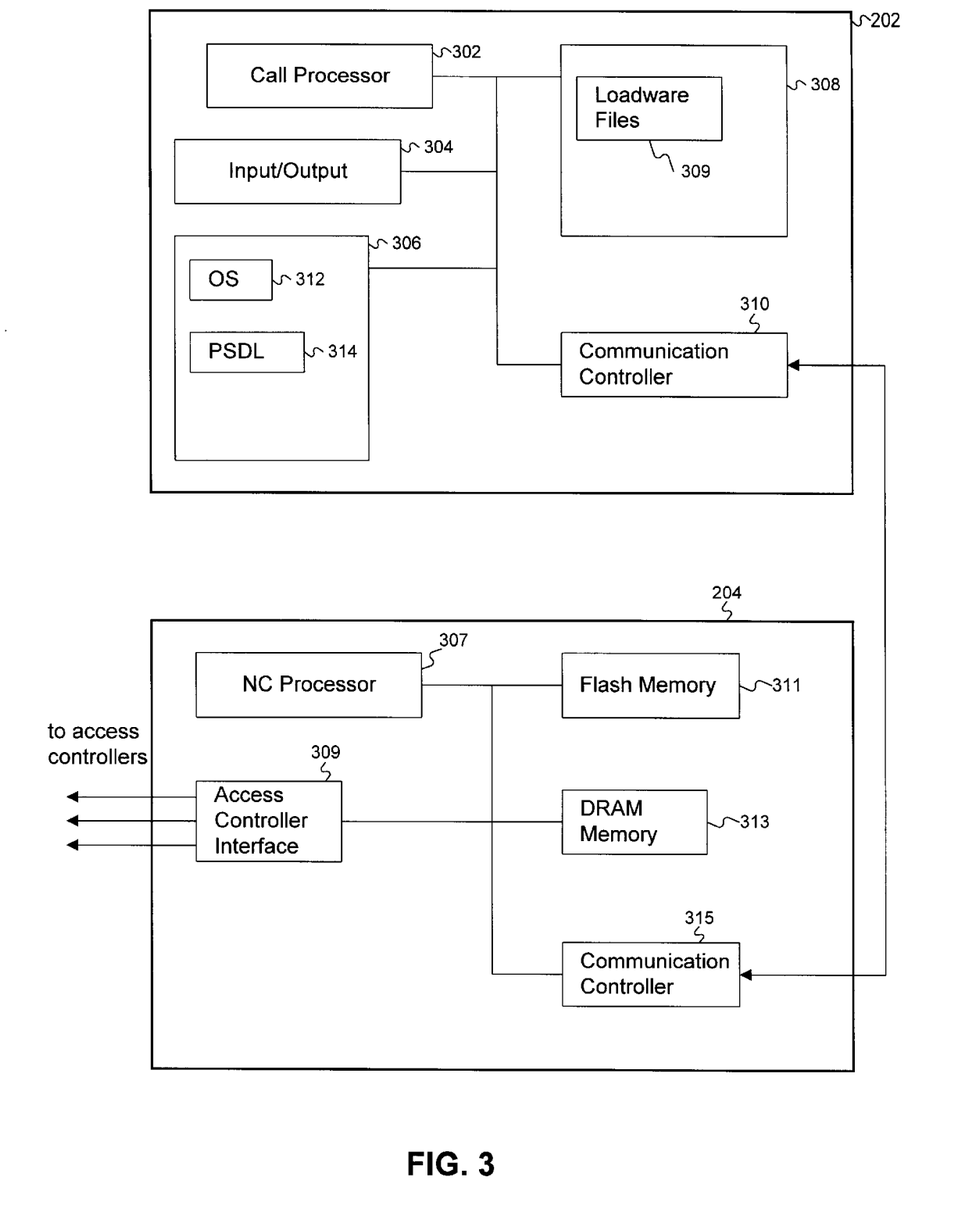
FIG. 3 is a block diagram of a call processor (CP) and an node controller (NC) suitable for use with methods and systems consistent with the present invention.

FIG. 3 is a block diagram of a call processor (CP) unit and a node controller (NC) unit 204 suitable for use with methods and systems consistent with the present invention. CP unit 202 includes a call processor 302, an input/output unit 304, a flash memory 306, a hard disk 308 having loadware files 309, and a communication controller 310. Call processor 302 is used to perform centralized system-level logic associated with switch 200. Specifically, methods and systems of the present invention use call processor 302 to process instructions associated with upgrading the software subsystems used in NC unit 204 and AC unit 206A.

A peripheral system download module (PSDL) 314 contained within flash memory 306 controls the erasing and burning of flash memory on the target packs such as NC unit 204. An operating system (OS) 312 is also contained within flash memory 306 and is used to manage local resources on CP unit 202. Generally, PSDL module 314 controls and coordinates software subsystem upgrades used in devices such as NC unit 204 and AC unit 206A. Details on the methods used in PSDL module 314 are discussed in further detail below.

Hard disk 308 on CP unit 202 includes loadware files 309 containing software subsystem updates used in switch 200. The specific contents of each loadware file 309 varies and depends on the software components used in a particular hardware component in switch 200. For example, one group of loadware files 309 may include software subsystem updates to features on NC unit 204 while another type of loadware file 309 includes software subsystem updates specific to features on AC unit 206A. Features on AC unit 206A can includes support for features such as conference and dial tone service, internal clocks for synchronization, and call forwarding. In general, systems and methods consistent with the present invention are used to update a variety of software subsystems and are not limited to only updating software subsystems that may be found on NC unit 204 or AC unit 206A.

Communication controller 310 facilitates communication of data and control signals between CP unit 202, NC unit 204, and AC unit 206A. Typically, communication controller 310 is an asynchronous transfer mode (ATM) based device capable of carrying IP or TCP/IP traffic. Alternative controller devices can also be implemented using ethernet technology in combination with TCP/IP or UDP/IP protocols. Using a common communication protocol, such as TCP/IP, cuts on development costs and provides a common networking platform to integrate different devices into switch 200.

NC unit 204 includes a NC processor 307, an access controller (AC) interface 305, a flash memory device 311, a DRAM memory device 313, and a communication controller 315 compatible with similar subsystems on CP unit 202. NC processor 307 processes incoming and outgoing calls and functions as a switching device for calls placed at different layers in switch 200. AC interface 305 provides a communication link between NC unit 204 and peripheral devices downstream from NC unit 204. As mentioned above, communication controller 315 uses a standard communication protocol, such as TCP/IP, to transfer data and control information between CP unit 202 and NC unit 204 while switch 200 downloads loadware file 309 or processes calls.

Flash memory 311 is preferably implemented with multiple-banks of flash memory. Separating flash memory 311 into multiple banks enables one to execute code located in one bank while writing or "burning", information in a second bank in flash memory 311 This is important if software subsystem updates are to be hot downloaded while the switch 200 continues to process and place calls. In alternative embodiments, flash memory 311, can be replaced with other types of computer-readable media, such as secondary storage devices, like hard disks, floppy disks, CD-ROM, or other forms of RAM or ROM. Data transmission mediums, such as a carrier wave on the Internet, is another type of computer-readable media which can also serve the function provided by flash memory 311. In contrast to flash memory 311, DRAM memory 313 is used to temporarily store data and control information while the NC unit 204 is up and processing calls on switch 200.

Figure 4:
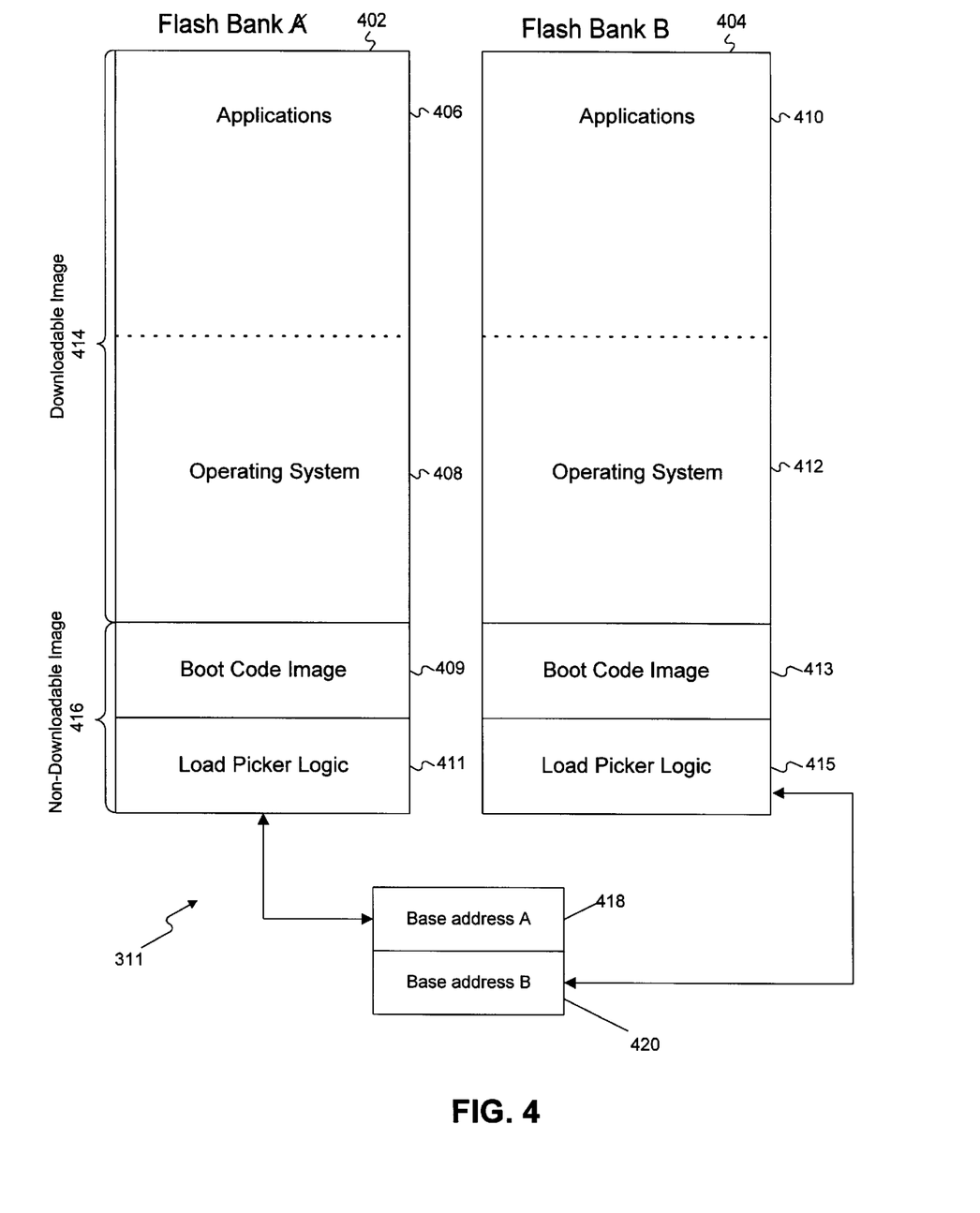
FIG. 4 is a block diagram of a dual-bank storage unit suitable for use with methods and systems consistent with the present invention.

FIG. 4 is a block diagram of a multiple-bank storage unit suitable for use with methods and systems consistent with the present invention. Each NC unit 204, AC unit 206A, or other NS device designed in accordance with the present invention include a multiple-bank storage device. Specifically, multiple-bank flash memory 311 includes at least flash bank A 402 and flash bank B 404 each loaded with a downloadable image 414 and a non-downloadable image 416. Downloadable image 414 contains the software subsystems which can be downloaded and updated while switch 200 is operating. Non-downloadable image 416 is installed at the factory and preferably is not upgraded at the customer site or in the field.

On flash bank A 402, downloadable image 414 includes an operating system 408 and applications 406. Operating system 408 also includes peripheral system download (PSDL) module which controls the actual erasing and burning of target packs in flash memory. Similarly, flash bank B 404 has a downloadable image 414 including operating system 412 with PSDL module (not shown) and applications 410. Corresponding non-downloadable images 416 on flash bank A 402 include a boot code image 409 which includes a loadpicker logic 411 for selecting a valid software subsystem. Flash bank B 404 also includes non-downloadable images 416 including a boot code image 413 having a loadpicker logic 415.

Loadpicker logic 411 and 415 selects a valid software subsystem from flash bank A 402 or flash bank B 404 accordingly. Downloadable image 414 is used to perform essential operations such as performing file transfers using a file transfer protocol like ftp or tftp, and broadcasting network information over a network connection using a network protocol such as UDP/IP.

Utilizing dual-banks enables one software subsystem to be executed in the active bank while updated software subsystems are downloaded into the idle bank. In FIG. 4, Base address A 418 corresponds to the active bank while Base address B 420 corresponds to the idle bank. This arrangement supports the "hot download" feature which enables software subsystem updates to be applied while NC unit 204 or AC unit 206A are up and running.

On conventional systems, flash images are statically linked and therefore are non-relocatable into a different address space. However, the present invention avoids these non-relocatable code issues with a programmable chip select that swaps base addresses of the two flash banks. This obviates the need to create and manage separate loadware images for each bank and address space. The programmable chip swaps base addresses and makes the updated flash bank active.

Load picker logic 411 in flash bank A 402 remaps the base address of the two flash banks depending on which flash bank contains a valid and updated software subsystem. After a software subsystem is upgraded, flash bank A and flash bank B essentially swap base address mapping values and thereby become active or inactive. This avoids complex code relocation issues because a single loadware file 309 can be used in multiple banks of flash memory 311 rather than having different loadware files 309 compiled and linked for each bank's address range.

This novel multiple-bank design feature also supports a "backdoor" that enables a controller, such as NC unit 204, to load a previous software subsystem when an attempt to upgrade the software subsystem fails. The backdoor is a technique for backing out a failed installation or upgrade of a software subsystem on a NS device. Consequently, before base addresses are swapped, loadpicker logic 411 in flash bank A 402 ensures that the updated software subsystems such as operating system 412 and applications 410 are properly downloaded into flash bank B 404. If the download did not occur properly, loadpicker logic 411 will activate the bank with non-updated and uncorrupted code. In this case, flash bank A. Alternatively, if the download does occur properly then the base addresses are swapped and the active bank becomes flash bank B rather than flash bank A.

Operation of the Switching Network

Figure 5:
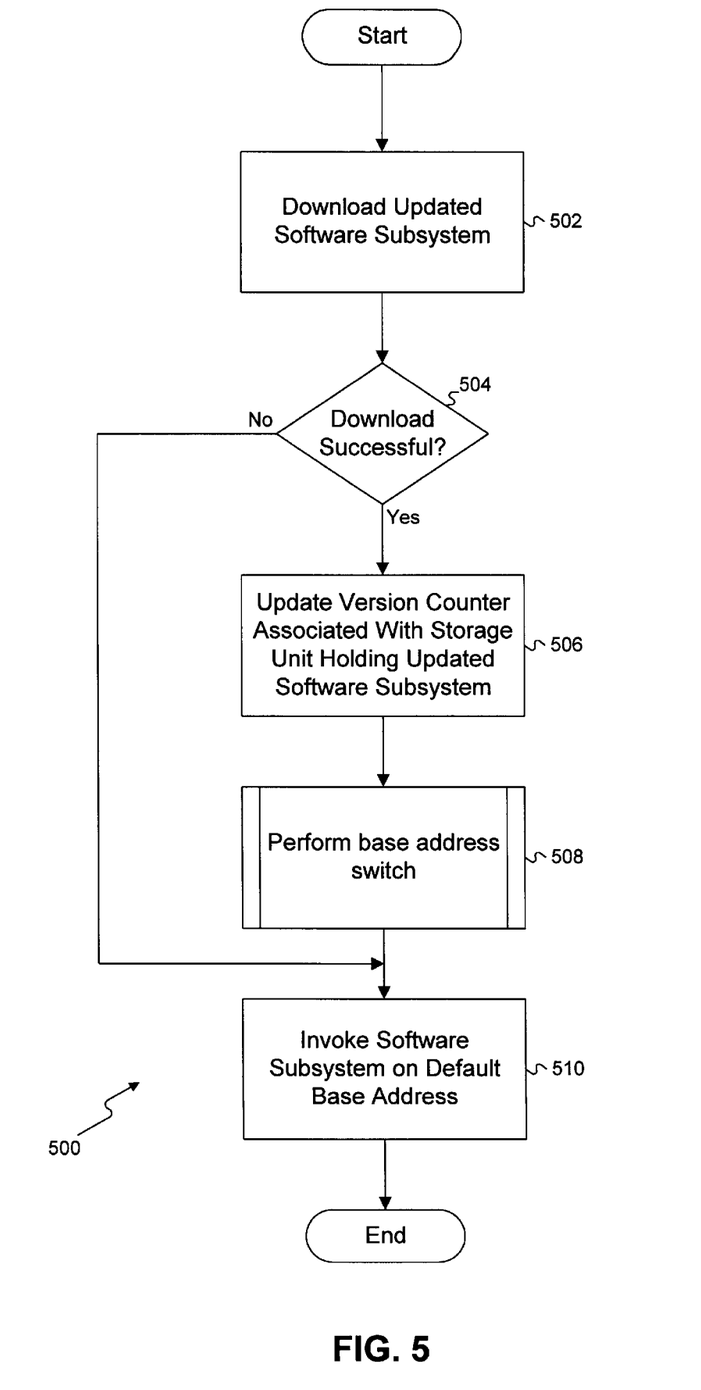
FIG. 5 is a flow chart indicating the steps for updating a software subsystem for use with methods and systems consistent with the present invention.

FIG. 5 is a flow chart of a method for updating a software subsystem suitable for use with the present invention. This method can be used to update a software subsystem stored on any network system having multiple memory banks and capable of holding multiple software subsystems. Preferably, services are provided from a software subsystem being executed in a primary bank of memory while the upgraded software subsystem is downloaded into a secondary bank of memory on the network system. The base addresses are swapped once the updated software subsystem is successfully downloaded and the execution begins using the upgraded software subsystem.

On switch 200, various software subsystems operate network systems such as NC unit 204 and AC unit 206A. Software subsystems on these network systems can be updated using methods and systems consistent with the present invention. Accordingly, the methods and systems applied to NC unit 204 and AC unit 206A are provided only as an example.

In operation, NC unit 204 processes instructions from a primary software subsystem loaded at a first base address associated with a primary bank of memory, such as flash bank A 402 in flash memory 311. By default, NC unit 204 processes instructions using the software subsystem located in flash memory 311 at base address A 418. PSDL in active bank A 402 executes a method consistent with the present invention downloading a secondary software subsystem, which is an updated version of the primary software subsystem, into a secondary memory bank such as flash bank B 404 at base address B 420 (step 502). In practice, CP shelf 202 initiates the download process where the target pack's contents are erased and burned with the updated software subsystem onto flash bank B 404 as a background task while the primary software subsystem stored in flash bank A 402 in flash-memory is actively executing call processing applications in the foreground.

The method determines if the updated software subsystem is downloaded successfully into the idle flash bank B404 by checking header values and checksum values associated with the updated software subsystem (step 504). If the download is not successful, processing continues on the primary software subsystem which in this example is stored in flash bank A 402, the active bank. Alternatively, after a successful download the method updates a version counter associated with flash bank B 404 indicating that a new version of the software subsystem has been loaded (step 506). The version counter is used later by loadpicking logic 411 when a reboot or reset occurs to determine which flash bank contains the latest software subsystem.

Once version information is updated, the method switches the active storage unit, for example flash bank A 402, to the idle storage unit, such as flash bank B404 (step 508). Preferably, the method switches banks by swapping base address A 418 associated with flash bank A402 with the base address B420 associated with the flash bank B404. This causes NC unit 204 to begin processing instructions from the updated software subsystem loaded at base address B 420 in flash bank B 404 (step 510). This completes the software subsystem upgrade process.

Figure 6:
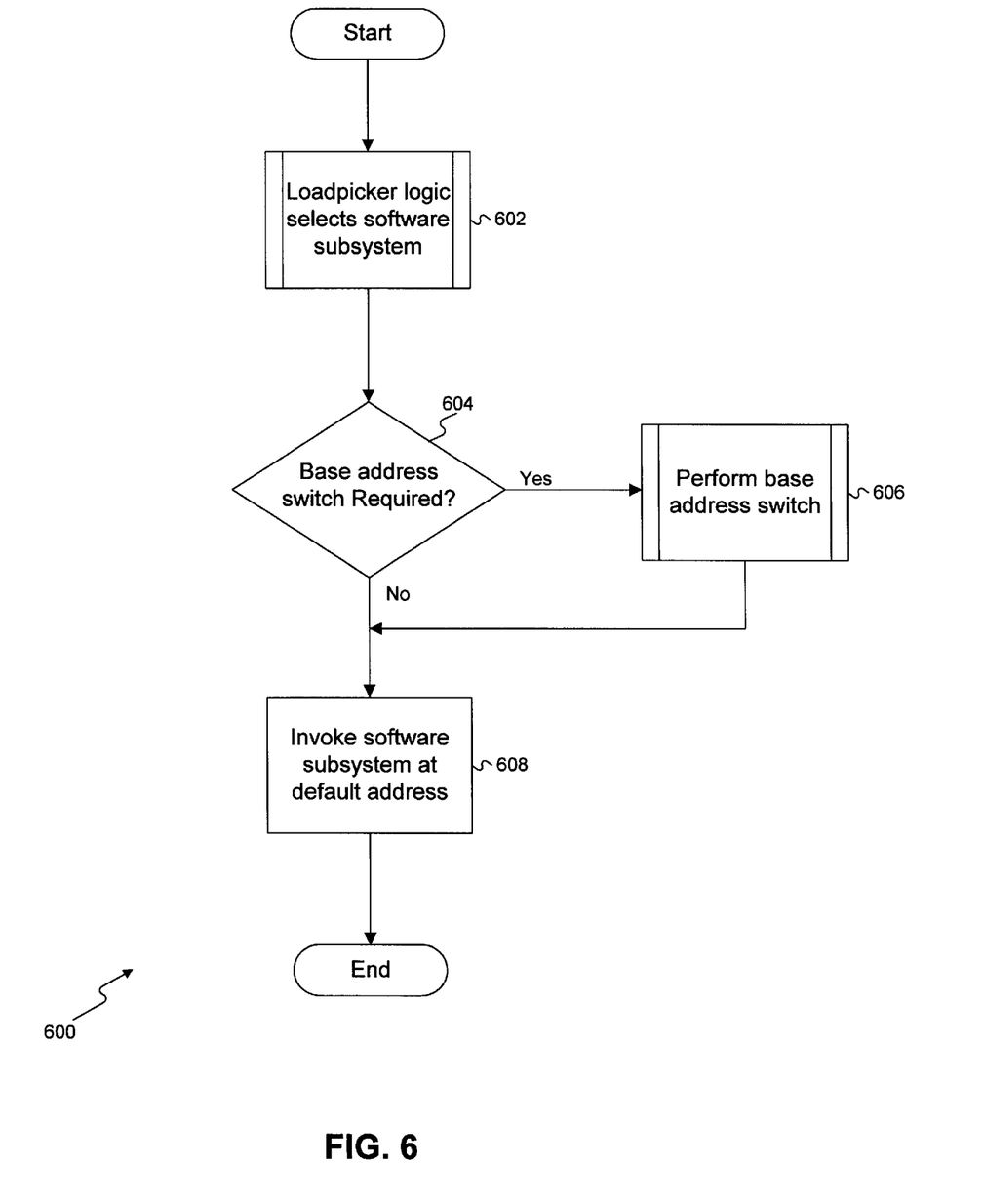
FIG. 6 is a flow chart indicating the steps for loading a software subsystem suitable for use with methods and systems consistent with the present invention.

FIG. 6 is a flow chart of a method for selecting the proper software subsystem suitable for use with methods and systems consistent with the present invention. These steps are used when a network system, such as NC unit 204, having dual-bank flash memory 311 is booted or reset. The method determines which software subsystem stored in dual-bank flash memory 311 should be executed. The method reviews the integrity and version of each software subsystem to determine which software subsystem should be executed. Specifically, this assumes that NC unit 204 has a primary software subsystem stored in flash memory 311 at a first base address, such as base address A 418, and a secondary software subsystem stored in flash memory 311 loaded at a second base address, such as base address B 420. In a preferred embodiment, however, NC unit 204, does not explicitly indicate which software subsystem should be loaded.

Loadpicker logic 411 selects which software subsystem should be executed (step 602). The base addresses loadpicker logic 411 swaps depends on which software subsystem is selected (step 604). If the selected software subsystem is loaded in flash memory 311 at base address A 418, then no base address switch is required. However, if the selected software subsystem in flash memory 311 is at base address B 420, then a base address switch is required (step 606). Details on swapping base address values is discussed below in connection with FIG. 8. Loadpicker logic 411 invokes the correct software subsystem once the base address is set properly (step 608).

Figure 7:
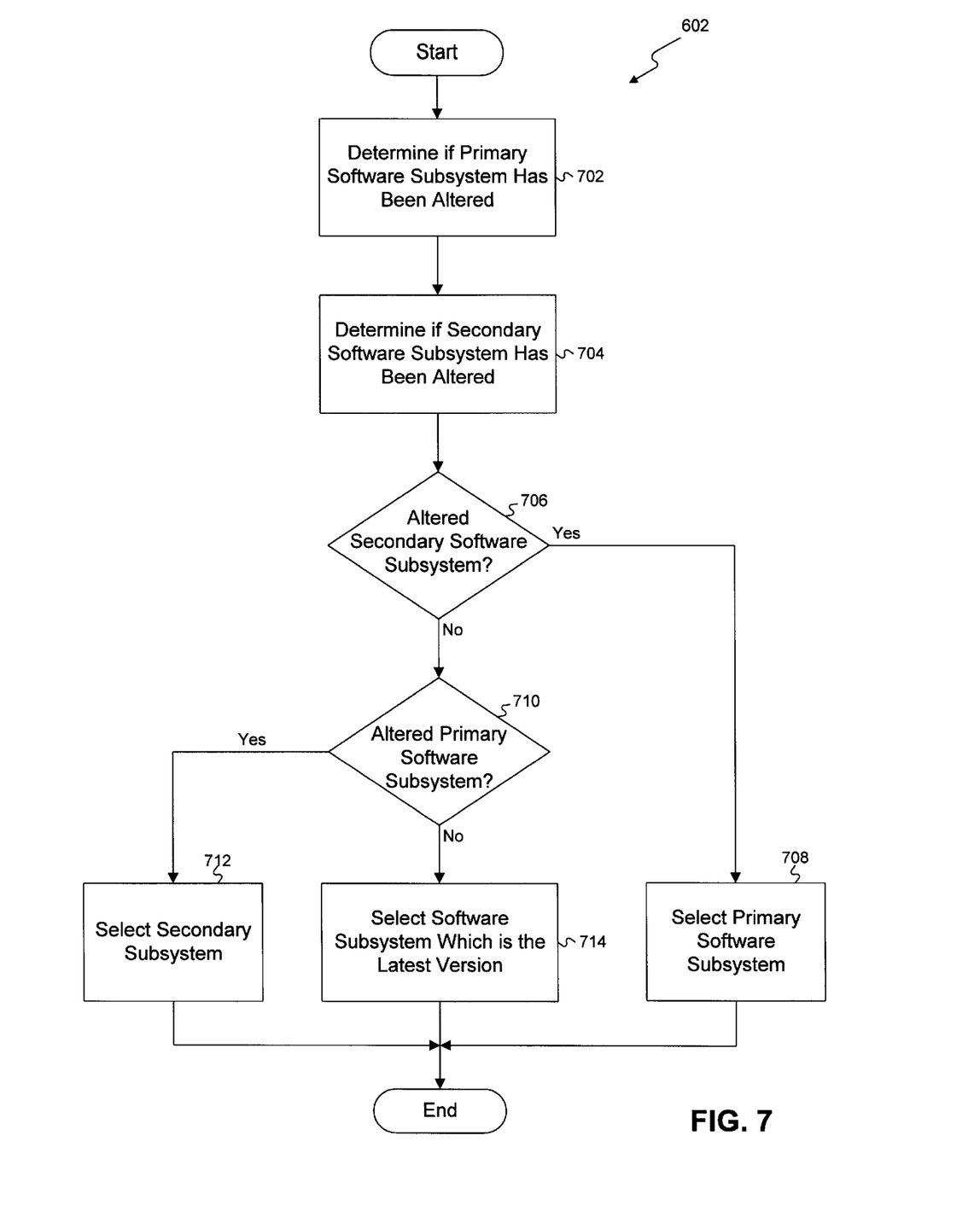
FIG. 7 is a flow chart indicating steps consistent with the present invention for picking which software subsystem should be selected from a dual-bank storage unit.

FIG. 7 is a flow chart of a method consistent with the present invention for selecting which software subsystem should be executed at step 602. Initially, loadpicker logic 411 determines whether the primary software subsystem has been altered or corrupted since it was generated (step 702). This typically involves checking header information in the primary software subsystem and verifyng the checksum value for the software subsystem. Similarly, loadpicker logic 411 performs an analysis of the header information and checksum information on the secondary software subsystem (step 704). In this example, primary software subsystem is stored in flash bank A 402 and secondary subsystem is stored in flash bank B 404 of flash memory 311.

The goal of loadpicker logic 411 is to select the latest software subsystem version that is properly downloaded and not corrupt or altered. Accordingly, if loadpicker logic 411 determines that secondary software subsystem is altered (step 706) then the primary software subsystem is selected (step 708). However, if the primary software subsystem is altered or corrupt then the secondary subsystem is selected (step 712). It should be noted that if both software subsystems appear to be corrupt, loadpicker logic 411 preferably selects the primary software subsystem (step 708). Under these circumstances, it is possible that the primary software subsystem may not execute properly. If both the primary and secondary subsystems are unaltered then loadpicker logic 411 selects the most recent software subsystem version (step 714). A version count associated with each flash bank in flash memory 311 is incremented each time a new version is downloaded from CP shelf 202. A higher version count indicates which bank in flash memory 311 contains the latest version.

Figure 8:
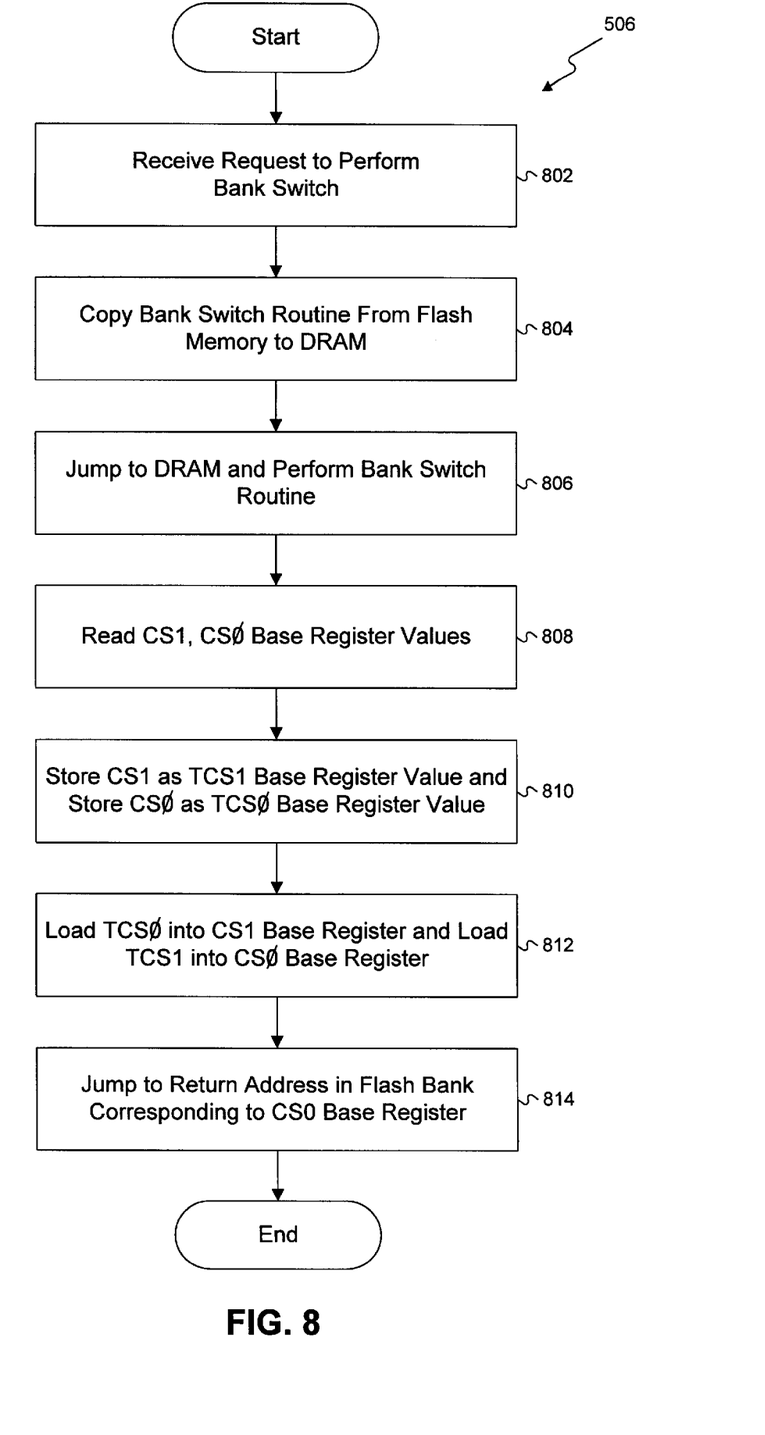
FIG. 8 is a flow chart indicating the steps for performing a bank switch in accordance with methods and systems consistent with the present invention.

FIG. 8 is a flow chart of a method for performing a bank switch consistent with the present invention. The bank switch command is received at step 508 after updating software while NC 104 is running or from step 606 when NC 204 boots or resets (step 802). The bank switch takes advantage of the programmable chip select feature typically found in many micro controller units such as the Motorola QUICC micro controller. This feature is used to remap the base addresses of each bank in flash memory 311.

In operation, the bank switch routine using the chip selects is copied from flash memory 311 to DRAM 312 (step 804). The program counter is set to an address in DRAM 312 and the bank switch routine is executed. The bank switch routine reads base register values CS0 and CS1 from each bank in flash memory 311 (step 808). Base register value CS1 is stored as temporary base register value TCS1 and base register value CS0 is stored in temporary base register value TCS0 (step 810). The base registers are then swapped by storing temporary base register value TCS0 as base register value CS1 and temporary base register value TCS1 as CS0 (step 812). Once the base register values are swapped, processing continues at the next address in the second bank in flash memory 311.

While specific embodiments have been described herein for purposes of illustration, various modifications may be made without departing from the spirit and scope of the invention. Accordingly, the invention is not limited to the above described embodiments, but instead is defined by the appended claims in light of their full scope of equivalents.

What is claimed is:

1. A method for updating a software subsystem used by a network system while services are being provided by the software subsystem, comprising the steps of:

processing instructions from a primary software subsystem loaded at a first base address associated with a primary storage unit coupled to the network system;

downloading a secondary software subsystem at a second base address associated with a secondary storage unit coupled to the network system; and activating the secondary software subsystem by selectively swapping the first base address associated with the primary storage unit with the second base address associated with the secondary storage unit.

2. The method of claim 1 which further comprises the step of:

incrementing a version counter associated with the secondary storage unit which indicates that the secondary storage unit contains an updated version of the software subsystem.

3. The method of claim 1 wherein the second software subsystem is an updated version of the primary software subsystem.

4. The method of claim 1 wherein the swapping step further comprises the substeps of:

storing the first base address associated with the primary storage unit in a temporary storage area;

associating the second base address with the primary storage unit; and associating the first base address stored in the temporary storage area with the secondary storage unit.

5. The method of claim 1 further comprising after the swapping step, the step of processing instructions from the secondary software subsystem loaded at a first base address associated with the secondary storage unit.

6. A method for loading a software subsystem on a network system which loads instructions from a first base address in a storage unit, comprising the steps of:

providing a primary software subsystem loaded at the first base address associated with a primary storage unit coupled to the network system;

providing a secondary software subsystem loaded at a second base address associated with a secondary storage unit coupled to the network system;

before executing the software subsystem, selecting a software subsystem from the primary software subsystem and the secondary software subsystem; and swapping the first base address associated with the primary storage unit and the second base address associated with the secondary storage unit if the secondary software subsystem is selected.

7. The method of claim 6 wherein the selecting step further comprises the substeps of:

determining whether the primary software subsystem and the secondary software subsystem have been altered since they were generated; and selecting the primary software subsystem if the secondary software subsystem is determined to have been altered.

8. The method of claim 7 wherein the selecting step further comprises the step of selecting the secondary software subsystem if the primary software subsystem is determined to have been altered and the secondary software subsystem is determined not to have been altered.

9. The method of claim 7 wherein the selecting step further comprises the step of selecting the secondary software subsystem if the primary software subsystem and the secondary software subsystem have not been altered and the secondary software subsystem is a later version of the software subsystem.

10. The method of claim 7 which further comprises the step of selecting the primary software subsystem if the secondary software subsystem and the primary software subsystems were both determined to have been altered.

11. The method of claim 6 which further comprises the step of loading instructions from a storage unit associated with the first base address and selected from among the primary storage unit and the secondary storage unit.

12. A computer program product capable of configuring a data processor to update a software subsystem used by a network system coupled to a server computer over a network while services are being provided by the software subsystem, the computer program product comprising program code to cause the data processor to perform the steps of:
   processing instructions from a primary software subsystem loaded at a first base address associated with a primary storage unit coupled to the network system;
   downloading a secondary software subsystem at a second base address associated with a secondary storage unit coupled to the network system; and
   activating the secondary software subsystem by selectively swapping the first base address associated with the primary storage unit with the second base address associated with the secondary storage unit.

13. The computer program product of claim 12 wherein the code includes the substep of:
   incrementing a version counter associated with the secondary storage unit which indicates that the secondary storage unit contains an updated version of the software subsystem.

14. The computer program product of claim 12 wherein the second software subsystem is an updated version of the primary software subsystem.

15. The computer program product of claim 12 wherein the swapping step further comprises the substeps of:
   storing the first base address associated with the primary storage unit in a temporary storage area;
   associating the second base address with the primary storage unit; and
   associating the first base address stored in the temporary storage area with the secondary storage unit.

16. The computer program product of claim 12 further comprising after the swapping step, the step of processing instructions from the secondary software subsystem loaded at a first base address associated with the secondary storage unit.

17. A computer program product capable of configuring a data processor to load a software subsystem on a network system which loads instructions from a first base address in a storage unit, comprising the steps of:
   providing a primary software subsystem loaded at the first base address associated with a primary storage unit coupled to the network system;
   providing a secondary software subsystem loaded at a second base address associated with a secondary storage unit coupled to the network system;
   before executing the software subsystem, selecting a software subsystem from the primary software subsystem and the secondary software subsystem; and
   swapping the first base address associated with the primary storage unit and the second base address associated with the secondary storage unit if the secondary software subsystem is selected.

18. The computer program product of claim 17 wherein the selecting step further comprises the substeps of:
   determining whether the primary software subsystem and the secondary software subsystem have been altered since they were generated; and
   selecting the primary software subsystem if secondary software subsystem is determined to have been altered.

19. The computer program product of claim 17 wherein the selecting step further comprises the step of selecting the secondary software subsystem if the primary software subsystem is determined to have been altered and the secondary software subsystem is determined not to have been altered.

20. An apparatus designed to update a software subsystem used by a network system coupled to a server computer over a network while services are being provided by the software subsystem comprising:
   a processing module configured to process instructions from a primary software subsystem loaded at a first base address associated with a primary storage unit coupled to the network system;
   a download module configured to download a secondary software subsystem at a second base address associated with a secondary storage unit coupled to the network system; and
   a swapping module configured to selectively swap the first base address associated with the primary storage unit with the second base address associated with the secondary storage unit by activating the secondary software subsystem.

21. The apparatus of claim 20 further comprising:
   a counter module configured to increment a version counter associated with the secondary storage unit which indicates that the secondary storage unit contains an updated version of the software subsystem.

22. An apparatus configured to load a software subsystem on a network system which loads instructions from a first base address in a storage unit, comprising:
   a primary software subsystem loaded at the first base address associated with a primary storage unit coupled to the network system;
   a secondary software subsystem loaded at a second base address associated with a secondary storage unit coupled to the network system;
   a selection module for selecting a software subsystem from the primary software subsystem and the secondary software subsystem before executing the software subsystem; and
   a swap module for swapping the first base address associated with the primary storage unit and the second base address associated with the secondary storage unit if the secondary software subsystem is selected.

23. The apparatus in claim 22 wherein the selection module step further comprises:
   a determination module capable of detecting whether the primary software subsystem and the secondary software subsystem have been altered since they were generated; and
   a selection module configured to select the primary software subsystem if the secondary software subsystem is determined to have been altered.

* * * * *